(12) United States Patent
Austin

(10) Patent No.: US 8,826,419 B2
(45) Date of Patent: Sep. 2, 2014

(54) COMPUTER DEVICE WITH ANTI-TAMPER RESOURCE SECURITY

(75) Inventor: Mark James Austin, Manchester (GB)

(73) Assignee: Avecto Limited, Cheadle Cheshire (GB)

( * ) Notice: Subject to any disclaimer, the term of this patent is extended or adjusted under 35 U.S.C. 154(b) by 0 days.

(21) Appl. No.: 13/601,686

(22) Filed: Aug. 31, 2012

(65) Prior Publication Data

US 2013/0061320 A1 Mar. 7, 2013

(30) Foreign Application Priority Data

Sep. 2, 2011 (GB) .................................. 1115141.2

(51) Int. Cl.
*H04L 9/32* (2006.01)
*G06F 21/00* (2013.01)
*G06F 21/62* (2013.01)
*G06F 15/16* (2006.01)

(52) U.S. Cl.
USPC ...................... 726/20; 726/9; 726/21; 726/27

(58) Field of Classification Search
USPC ........................................... 726/20, 9, 21, 27
See application file for complete search history.

(56) References Cited

U.S. PATENT DOCUMENTS

2002/0099952 A1* 7/2002 Lambert et al. ............... 713/200
2006/0248585 A1 11/2006 Ward et al.

FOREIGN PATENT DOCUMENTS

| WO | 9964946 A1 | 12/1999 |
| WO | 9964947 A1 | 12/1999 |
| WO | 9964948 A1 | 12/1999 |
| WO | 9965207 A1 | 12/1999 |
| WO | WO 2013062352 A1 * | 5/2013 |

OTHER PUBLICATIONS

Owen S. Hofmann, Sangman Kim, Alan M. Dunn, Michael Z. Lee, Emmett Witchel; "InkTag: secure applications on an untrusted operating system"; Apr. 2013; ASPLOS '13: Proceedings of the eighteenth international conference on Architectural support for programming languages and operating systems; Publisher: ACM; pp. 265-278.*

Microsoft TechNet. "How Access Tokens Work." Online publication Mar. 28, 2003, Microsoft Corporation. http://technet.microsoft.com/en-us/library/cc783557(WS.10).aspx.

Microsoft TechNet. "Authorization and Access Control Technologies." Online publication Mar. 28, 2003, Microsoft Corporation. http://technet.microsoft.com/en-us/library/cc782880(WS.10).aspx.

International Search Report, International Application No. PCT/GB2012/052135. Date of mailing: Nov. 22, 2012. European Patent Office, Rijswijk, Netherlands.

* cited by examiner

*Primary Examiner* — Andrew Nalven
*Assistant Examiner* — Courtney Fields
(74) *Attorney, Agent, or Firm* — Coats & Bennett, PLLC

(57) ABSTRACT

A computer device provides an execution environment that supports a plurality of processes. A plurality of key resources are associated with a security application that may perform process elevation to grant privileged access rights to a user process. A security module controls access to the key resources using an access control list. An anti-tamper mechanism creates a protection group as a local security group and adds a deny access control entry to the access control list. The anti-tamper mechanism intercepts the user process and creates a revised access token identifying the user process as a member of the protection group. The security module matches the protection group in the revised access token of the user process against the deny access control entry in the access control list of the key resources thereby restricting access by the user process even though the user process otherwise has privileges to access those resources.

18 Claims, 3 Drawing Sheets

COMPUTER DEVICE WITH ANTI-TAMPER RESOURCE SECURITY

CROSS-REFERENCE TO RELATED APPLICATIONS

This application claims priority from foreign application GB1115141.2 entitled "Computer Device With Anti-Tamper Resource Security," which was filed in the United Kingdom on Sep. 2, 2011, and which is hereby incorporated by reference in its entirety.

TECHNICAL FIELD

The present invention relates generally to the field of computers and computer devices. More particularly, the present invention relates to a method and apparatus for controlling access to resources in a computer device.

BACKGROUND

A computer device executes a process using a plurality of physical and logical resources, which are provided, ultimately, by the underlying hardware of the computer device. These resources include, for example, system services, drivers, files and registry settings. Many operating systems include a security module that enforces access rights for each process, whereby the process is permitted (or denied) access to each of the resources, consistent with a set of security privileges allocated to that process.

It is desirable to implement a least-privilege access model, whereby each process is granted the minimal set of access privileges sufficient for that process to operate on the computer device. For example, a user-level process is able to read from a particular file, but is not permitted to write to that file. Meanwhile, a local administrator level typically has a higher privilege, e.g. is able to both read and write to that file.

Unfortunately, in practice, many application programs require a relatively high privilege level, such as the local administrator level, in order to install and operate correctly. There is a tendency for user processes to gain additional privilege rights, such as local administrator level, and thus gain greater access to the resources of the computer device. These additional privilege rights may then enable accidental tampering with key resources of the computer device, leading to errors or corruption within the device. Further, a particular user process (e.g. an infection or malware) may maliciously access key resources of the computer device with the deliberate intention of subverting security or causing damage.

Therefore, the inventors have identified a desire to provide a mechanism which prevents a user process from accessing key resources of the computer device. It is desired that an anti-tamper mechanism should be effective even if the user process has a relatively high privilege level such as a local administrator level.

The example embodiments have been provided with a view to addressing at least some of the difficulties that are encountered in current computer devices, whether those difficulties have been specifically mentioned or will otherwise be appreciated from the discussion herein.

SUMMARY

According to the present invention there is provided a computer device, a method and a computer-readable storage medium as set forth in the appended claims. Other, optional, features of the invention will be apparent from the dependent claims, and the description which follows.

At least some of the following example embodiments provide an improved mechanism for controlling access to a resource in a computer device. There now follows a summary of various aspects and advantages according to embodiments of the invention. This summary is provided as an introduction to assist those skilled in the art to more rapidly assimilate the detailed discussion herein and does not and is not intended in any way to limit the scope of the claims that are appended hereto.

In one example there is provided method of protecting resources in a computer system against tampering by a user process, wherein the computer system includes at least a memory unit and a processor unit which are operated to perform the steps of: identifying a plurality of resources of the computer system as being key resources associated with a security application; controlling access to the key resources using an access control list; and providing the user process in a user security context having an access token denoting access rights capable of accessing the key resources according to the access control list; creating a protection group as a local security group; adding a deny access control entry to the access control list thereby restricting access to the key resources of the security application by members of the protection group; intercepting the user process; creating a revised access token by revising the access token of the user process to include the protection group, thereby identifying the user process as a member of the protection group; applying the revised access token to the user process; and matching the protection group in the revised access token of the user process against the deny access control entry in the access control list of the key resources thereby restricting access by the user process in response to the user process requesting access to any of the key resources of the security application.

In one aspect, a computer device is provided having a memory unit and one or more processors which operate to provide an execution environment that supports a plurality of processes. The computer device may further support a security application that performs process elevation to grant privileged access rights to a user process. A security module is arranged to control access to key resources of the security application using an access control list. An anti-tamper mechanism creates a protection group as a local security group and adds a deny access control entry to the access control list. The anti-tamper mechanism intercepts the user process and creates a revised access token identifying the user process as a member of the protection group. The security module matches the protection group in the revised access token against the deny access control entry thereby restricting access by the user process to the key resources of the security application even though the user process otherwise has privileges which would allow access to those resources.

In one example there is provided a computer device, comprising: an execution environment that supports a plurality of processes; one or more key resources which are associated with a security application; a security module arranged to control access by the plurality of processes to the key resources associated with the security application using an access control list; and wherein the plurality of processes include at least one user process in a user security context having an access token denoting access rights capable of accessing the key resources according to the access control list; wherein the computing device further comprises: an anti-tamper mechanism arranged to create a protection group as a local security group and add a deny access control entry to the access control list thereby restricting access to the key resources of the security application by members of the protection group; wherein the anti-tamper mechanism is further arranged to intercept the user process, create a revised access token which includes the protection group based on the access token of the user process, thereby identifying the user process as a member of the protection group, and apply the revised access token to the user process; and wherein the security module is arranged to match the protection group in the revised access token of the user process against the deny access control entry in the access control list of the key resources thereby restricting access by the user process in response to the user process requesting access to any of the key resources of the security application.

In one example, the anti-tamper mechanism is arranged to dynamically modify the access token of the user process without terminating and restarting the user process.

In one example, the security application is arranged to grant access privileges to the at least one user process. The security application may be a privilege process manager arranged to selectively grant privileges to one or more user processes. In one example, the user process is initially provided in an unprivileged user-level security context having relatively low privileges as defined by an initial access token, and the security application is arranged to perform process elevation, whereby the user process is examined and selectively granted a privileged user security context as a dynamic elevation of the privilege level of the user process.

In one example, the anti-tamper mechanism is arranged to intercept the user process upon start-up. In one example, the anti-tamper mechanism is arranged to intercept the user process by intercepting an application programming interface function that creates processes. In one example, the anti-tamper mechanism is arranged to intercept the user process by subscribing to a notification of when a process starts. In one example, the anti-tamper mechanism is arranged to cause the user process to be started in a suspended state. In one example, the anti-tamper mechanism is arranged to examine the user process while the user process is in the suspended state. In one example, the anti-tamper mechanism is arranged to examine the user process by checking the user process against a set of policies using one or more attributes of the user process. In one example, the attributes of the user process include any one or more of filename, command line or publisher of the user process, or the identity of a user of the user process. In one example, the key resources include installed software of the security application. In one example, the key resources include system services, drivers, files and/or registry settings.

In one example, a tangible, non-transient computer-readable storage medium is provided having recorded thereon instructions which, when implemented by a computer device, cause the computer device to be arranged as set forth herein and/or which cause the computer device to perform the method as set forth herein. In one example, the recorded instructions cause the computer device to perform the steps of: identifying a plurality of resources of the computer system as being key resources associated with a security application; controlling access to the key resources using an access control list; and providing the user process in a user security context having an access token denoting access rights capable of accessing the key resources according to the access control list; creating a protection group as a local security group; adding a deny access control entry to the access control list thereby restricting access to the key resources of the security application by members of the protection group; intercepting the user process; creating a revised access token by revising the access token of the user process to include the protection group, thereby identifying the user process as a member of the protection group; applying the revised access token to the user process; and matching the protection group in the revised access token of the user process against the deny access control entry in the access control list of the key resources thereby restricting access by the user process in response to the user process requesting access to any of the key resources of the security application.

Of course, those skilled in the art will appreciate that the present invention is not limited to the above contexts or examples, and will recognize additional features and advantages upon reading the following detailed description and upon viewing the accompanying drawings.

BRIEF DESCRIPTION OF THE DRAWINGS

For a better understanding of the invention, and to show how example embodiments may be carried into effect, reference will now be made to the accompanying drawings in which.

DETAILED DESCRIPTION

The example embodiments of the present invention will be discussed in detail in relation to Microsoft Windows operating systems. However, the teachings, principles and techniques of the present invention are also applicable in other example embodiments. For example, the example embodiments are also applicable to other operating systems, in particular those having a discretionary access control security model.

Figure 1:
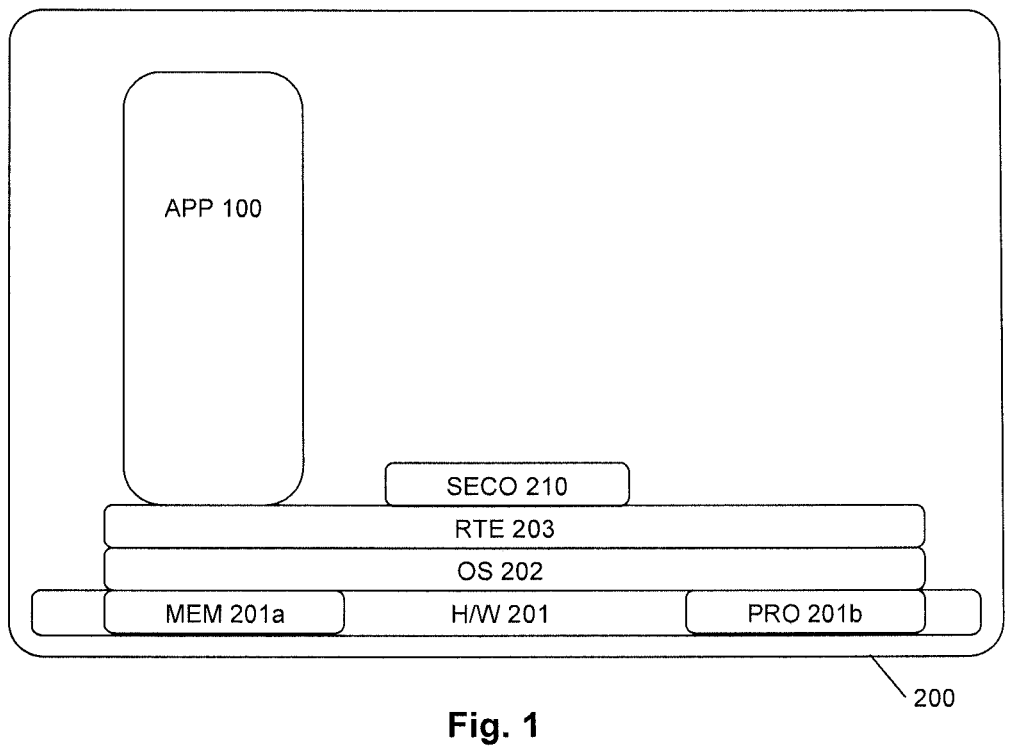
FIG. 1 is a schematic overview of an example computer device in which the example embodiments may be applied.

FIG. 1 is a schematic overview of a computer device 200 according to an example embodiment of the present invention. In this example, the host computer device 200 includes physical hardware (shown as "H/W" in the drawing) 201 such as a memory ("MEM") 201*a*, one or more processors ("PRO") 201*b*, I/O interfaces, backbone, power supply and so on, such as are found in, for example, a typical server computer. An operating system (OS) 202 provides a multitude of components, modules and units that coordinate to provide a runtime environment (RTE) 203 which supports execution of at least one application program (APP) 100.

As shown in FIG. 1, the operating system 202 includes a security module (SECO) 210 which is provided to enforce security with the computing device 200. As one example, the security module 210 is provided by the Windows™ operating system as supplied by Microsoft Corp of Redmond, Wash., USA, under the trade marks Windows NT, Windows 2000, Windows XP, Windows Vista, Windows Server 2003, Windows Server 2008, and Windows 7, amongst others. The security module 210 suitably enacts the Windows security model as described, for example, in "Windows Security Overview" published 10 Jun. 2011 by Microsoft Corporation and which is incorporated herein by reference in its entirety.

Figure 2:
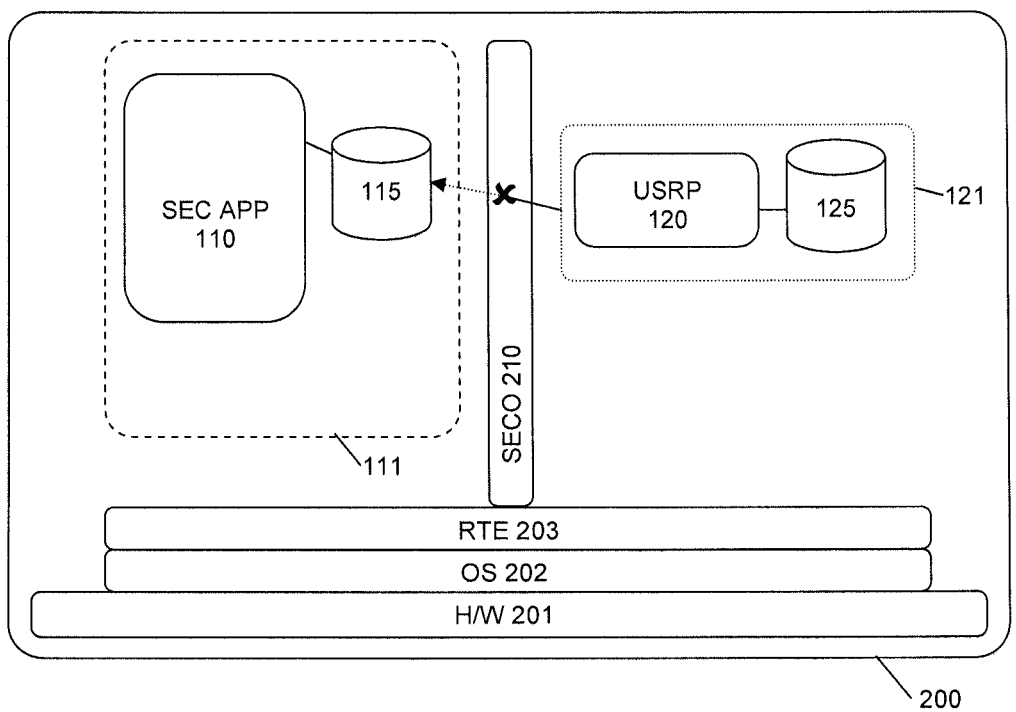
FIG. 2 is a schematic diagram showing the example computing device in more detail.

FIG. 2 is a schematic diagram showing the example computing device 200 in more detail. Here, the computing device further includes a security application (SEC APP) 110 which is provided in a privileged security context 111 and is associated with a set of key resources 115. FIG. 2 also shows at least one user process (USRP) 120 which is provided in a user-level security context 121 and is associated with a set of user resources 125. Typically, the security module 210 provided by the operating system 202 is sufficient to prevent the user process 120 from tampering with the key resources 115 which are associated with the security application 110. Here, the key resources 115 may include the installed software of the security application 110. The key resources 115 may further include system services, drivers, files and/or registry settings of the security application 110.

In this example, the security application 110 is a security solution that itself provides some type of security protection from malicious activity, whether intentional or unintentional. The nature of security software leads to most security solutions containing privileged processes and/or drivers. A well designed security solution should not allow a standard (unprivileged) user process to tamper with the solution. However, even well designed security solutions could be open to tampering (intentional or unintentional) from privileged users or processes.

As will be explained in more detail below, the example embodiments are particularly concerned with a security application 110 whose primary purpose is to manage the granting of privileges to a user or their user processes 120. However, in this situation, the ability of these privileged processes to tamper with the security solution is a potential weakness in the security solution.

Thus, it is desired to provide a dynamic mechanism to protect the security solution from privileged processes 120 that could be used to tamper with the security solution. It is desired that the mechanism can be used to distinguish between processes that are "authorized" to administer the security solution and those that are not, regardless of their privilege level.

In the example embodiments, these "unauthorized" privileged processes 120 are prevented from tampering or controlling the security solution by making a dynamic modification to an access token, which when matched against an access control list of the components of the security solution will prevent unauthorized interactions.

Figure 3:
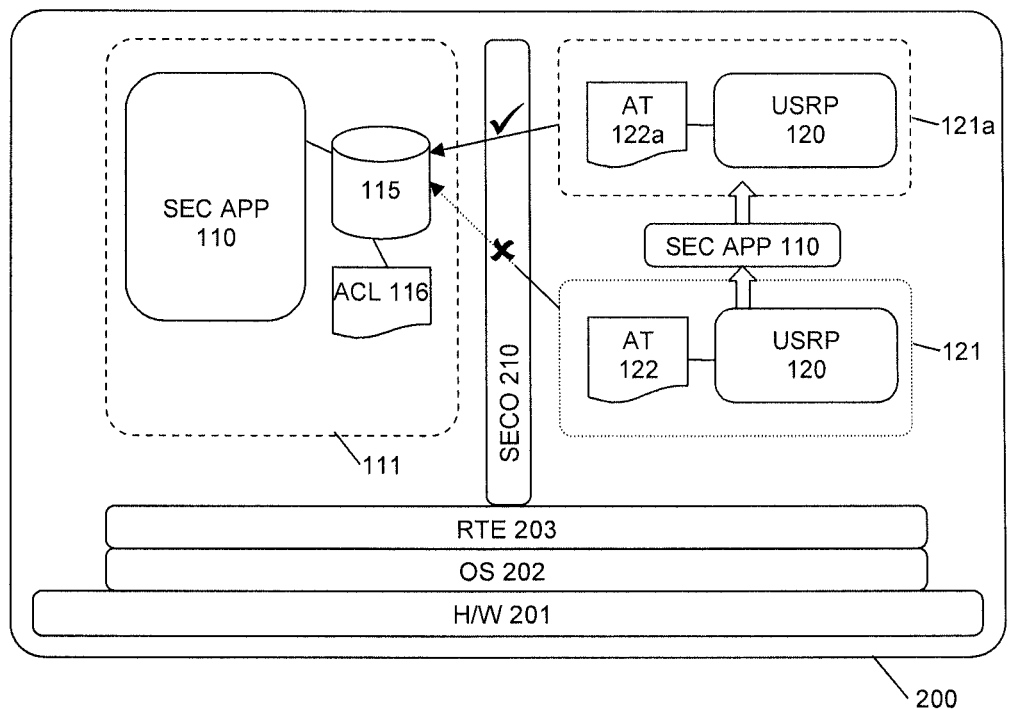
FIG. 3 is a schematic diagram showing the example computing device in more detail.

FIG. 3 is a schematic diagram showing the example computing device 200 in more detail. In this example embodiment, the user process (USRP) 120 is initially provided in an unprivileged user-level security context 121 having relatively low privileges as defined by an access token (AT) 122. As such, the security module (SECO) 210 in the operating system 202 is sufficient to prevent the user process 120 from tampering with the security application 110 and the key resources 115, according to a respective access control list 116. For example, the user process 120 is able to read from, but not write to, a file of the key resources 115. In this embodiment, the access types will depend upon the type of resource being accessed. For example, storage is typically defined by read and write access rights, while a process may have terminate access rights which determine whether or not a request to terminate that process will be actioned by the operating system 202. The initial unprivileged user-level security context 121 is based on the user as the security principal and the user access token 122 is set accordingly. In a system which adopts a least-privilege access model, the user-level security context 121 is deliberately restricted to a minimal set of access rights.

In this example embodiment, the security application 110 is arranged to perform process elevation, whereby the user process 120 is examined and selectively granted a privileged user security context 121a by the security application 110. This can be considered as a dynamic elevation of the privilege level of the user process 120, so that the user process is able to achieve a desired, legitimate function which requires a greater access rights. If the process 120 is to be elevated then a new access token 122a is created that is based on the user's access token 122. As one example, the local administrator group and the administrator privileges and integrity level are set in this new access token 122a. The user process 120 is then assigned this new access token 122a and the privileged user security context 121a is applied. However, as a potentially undesirable side-effect of this process elevation, the user process 120 is now provided in a privileged user security context 121a having an access token 122a denoting access rights capable of accessing the security resources 115 associated with the security application 110. In this situation, the security module 210 is now incapable of denying access by the user process 120 to the plurality of key resources 115.

Figure 4:
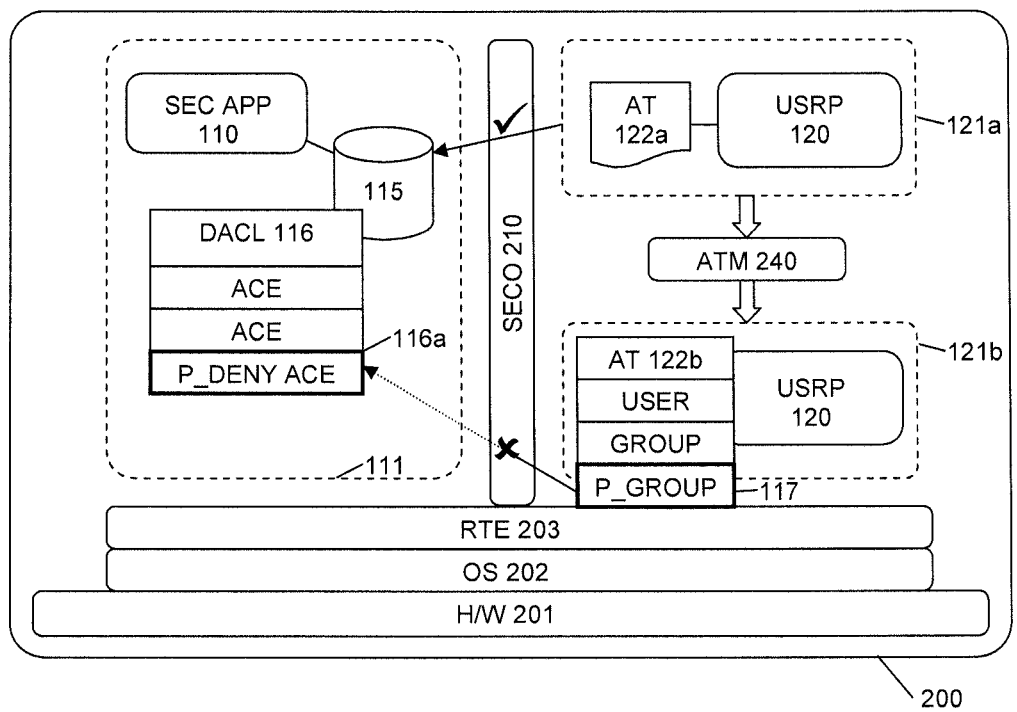
FIG. 4 is a schematic diagram showing the example computing device in more detail.

FIG. 4 is a schematic diagram showing the example computing device 200 in more detail. Initially, in this example embodiment, the access control list (DACL) 116 associated with the resources 115 of the security application (SEC APP) 110 permits access according to the access token (AT) 122a of the user process (USRP) 120. In this example, the process elevation mechanism described above has been used to arrive at this state. However, this state may, in other example embodiments, be achieved by other routes, such as by the user having a higher privilege level (e.g. by the user logging in to the computing device 200 as a local administrator).

As shown in FIG. 4, an anti-tamper mechanism (ATM) 240 is provided which prevents the user process 120 from tampering with the resources 115 of the security application 110.

Suitably, in preparation, the anti-tamper mechanism 240 adds a deny access control entry (P_DENY ACE) 116a to the access control list (DACL) 116 associated with the security application 110. The deny access control entry 116a identifies a protection group (P_GROUP) 117 as a local security group within the computing device 200. Thus, any identified member of this local security group 117 will be denied access of the relevant type to the relevant resource 115, as defined in the deny access control entry 116a.

The anti-tamper mechanism 240 is arranged to intercept the user process 120, examine the user process 120, and selectively apply a revised access token 122b to the user process 120. The anti-tamper mechanism 240 may create the revised access token 122b by revising the previous access token 122a of the user process 120. Suitably, the revised access token 122b includes the predetermined protection group (P_GROUP) 117, thereby identifying the user process 120 as a member of the protection group 117. Thus, the user process 120 initially has a privileged user security context 121a, as discussed above. This security context is dynamically modified by the anti-tamper mechanism 240 so that a privileged, tamper-restricted, user security context 121b is defined.

As one example implementation, the user process 120 is intercepted as it starts (either by intercepting an API function that creates processes or by subscribing to a notification when a process starts). After intercepting process creation, the user process 120 is started in a suspended state. Typically, this suspended state allows the user process 120 to be examined before it has any opportunity to execute even a single line of code. The user process 120 is then examined to determine whether it should be restricted to prevent tampering with the security application 110. For example, this examination may involve checking the process 120 against a set of policies using attributes such as filename, command line, publisher, etc, along with the user who owns the process. If the process 120 is to be tamper-restricted then the revised access token 122b is created.

This revised access token 122b is suitably based on the access token 122a currently provided to the user process 120. The user process 120 is then assigned this revised access token 122b and resumed from its suspended state, or the process is terminated and restarted with the revised access token 122b, so that the revised access token 122b takes effect with respect to the user process 120.

When the user process 120 requests access to the key resource 115 of the security application 110, via the security module 210 in the operating system 202, the protection group 117 in the revised access token 122b of the user process 120 will match against the deny access control entry 116a in the access control list 116 thereby restricting access by the user process 120 to the key resources 115 of the security application 110. In this way, tampering with the resources 115 is prevented, even though the user process initially had access rights to those resources.

In the example embodiments, the protection group 117 is used to restrict access to the security solution by adding a DENY ACE entry to the discretionary access control list (DACL) 116 of the resources of the security solution, such as installed files, registry keys, services, drivers etc. For instance, the protection group 117 can be used to deny write access to registry keys and files that belong to the security solution or to prevent a system service or driver of the security solution from being stopped or deleted.

In the example embodiments, in order to protect the security solution, every user process 120 is intercepted as it starts. If the process 120 should be prevented from tampering with the security solution (e.g. the process or user is not authorized to administer the security solution) then the revised access token 122b is created that is based on the original access token 122a, but includes the protection group as a DENY ONLY SID. The presence of the DENY ONLY SID in the access token 122b of the process 120 will prevent that process from tampering with the components of the security solution, as it will match the DENY ACE entry in the DACL 116 of the security solution's resources 115.

Figure 5:
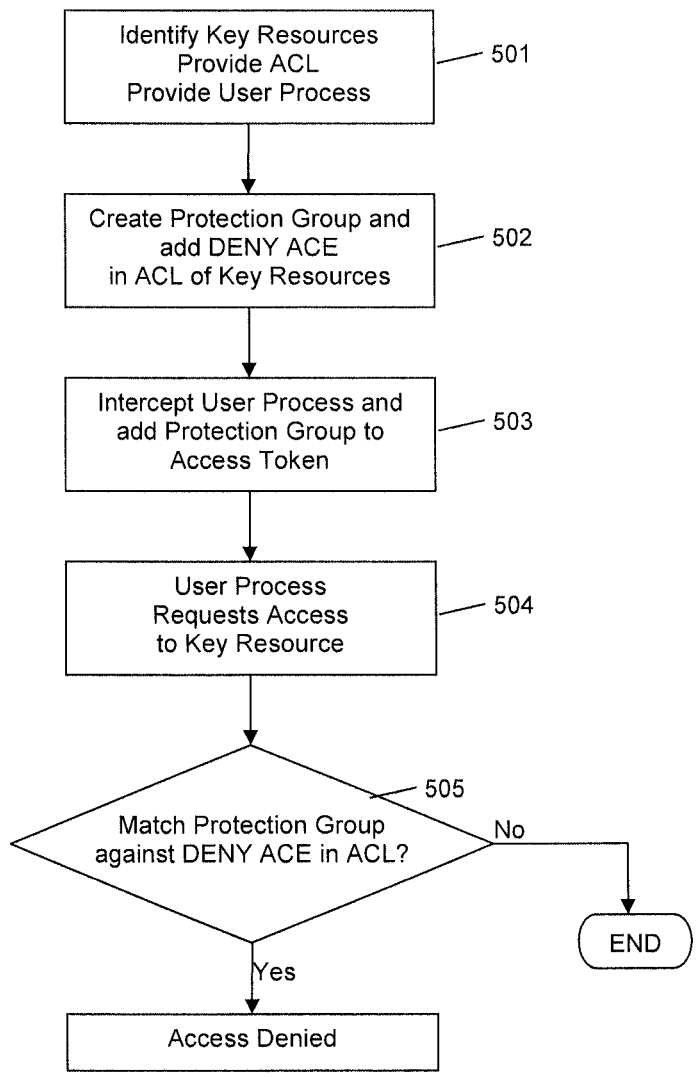
FIG. 5 is a schematic flowchart of an example method of controlling access to a resource in a computer device.

FIG. 5 is a schematic flowchart of an example method of controlling access to a resource in a computer device. The example method is arranged to protect resources in a computer system against tampering by a user process. Step 501 comprises identifying a plurality of resources of the computer system as being key resources associated with a security application, controlling access to the key resources using an access control list; and providing the user process in a user security context having an access token denoting access rights capable of accessing the key resources according to the access control list. Step 502 comprises creating a protection group as a local security group and adding a deny access control entry to the access control list thereby restricting access to the key resources of the security application by members of the protection group. Step 503 comprises intercepting the user process, creating a revised access token by revising the access token of the user process to include the protection group, thereby identifying the user process as a member of the protection group, and applying the revised access token to the user process. At step 504, the user process requests access to one or more of the previously identified key resources of the security application. Step 505 comprises matching the protection group in the revised access token of the user process against the deny access control entry in the access control list of the key resources thereby restricting the requested access by the user process.

Advantageously, according to the anti-tamper mechanism 240 as described herein, processes 120 can be dynamically prevented from tampering with a security solution, even if the processes 120 are privileged processes. Hence, the anti-tamper mechanism 240 is particularly relevant in the context of a privilege management solution which elevates processes, by ensuring that those elevated processes can't then tamper with the privilege management solution.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the example embodiments have been described with reference to the components, modules and units discussed below, such functional elements may be combined into fewer elements or separated into additional elements.

In summary, the example embodiments have described an improved mechanism to control access to a resource within a computer device. The industrial application of the example embodiments will be clear from the discussion herein.

Although a few preferred embodiments have been shown and described, it will be appreciated by those skilled in the art that various changes and modifications might be made without departing from the scope of the invention, as defined in the appended claims.

The invention claimed is:

1. A method of protecting resources in a computer system against tampering by a user process, wherein the computer system includes at least a memory unit and a processor unit, the method comprising:

providing a plurality of resources of the computer system using the memory unit and the processor unit;

identifying one or more of the plurality of resources of the computer system as being key resources which are associated with a security application in the computer system;

controlling access to the one or more key resources of the computer system using an access control list;

providing the user process, initially, in an unprivileged user-level security context, the user process having low privileges and including an initial access token that defines the low privileges and access rights for the user process to allow the user process to access the key resources according to the access control list;

performing, by a security application, process elevation to selectively grant a privileged user-level security context to the user process thereby dynamically elevating the privilege level of the user process;

executing the user process in the user-level security context in accordance with the dynamically elevated privilege level;

creating a protection group as a local security group;

adding a deny access control entry to the access control list thereby restricting access to the key resources of the security application by members of the protection group;

intercepting the user process;

creating a revised access token by revising the initial access token of the user process to include the protection group, thereby identifying the user process as a member of the protection group;

applying the revised access token to the user process; and in response to the user process requesting access to any of the one or more key resources of the security application, matching the protection group in the revised access token of the user process against the deny access control entry in the access control list of the key resources, thereby restricting access by the user process to the key resources.

2. The method of claim 1, wherein revising the access token of the user process comprises dynamically modifying the access token of the user process without terminating and restarting the user process.

3. The method of claim 1, further comprising granting access privileges to the user process using the security application.

4. The method of claim 1, wherein the intercepting the user process comprises intercepting the user process upon start-up of the user process.

5. The method of claim 1, wherein the intercepting the user process comprises intercepting an application programming interface function that creates processes.

6. The method of claim 1, wherein the intercepting the user process comprises subscribing to a notification of when a process starts.

7. The method of claim 1, wherein the intercepting the user process comprises starting the user process in a suspended state.

8. The method of claim 7, comprising examining the user process while the user process is in the suspended state and determining whether to create the revised access token, or maintain the access token as currently applied to the user process.

9. The method of claim 8, wherein examining the user process comprises checking the user process against a set of policies using one or more attributes of the user process.

10. The method of claim 9, wherein the attributes of the user process include any one or more of a filename, a command line, a publisher of the user process, and an identity of a user of the user process.

11. The method of claim 1, wherein the key resources include any one or more of: installed software of the security application, system services, drivers, files and registry settings.

12. A computer device having a memory and at least one processor unit, the computer device configured to provide:

an execution environment;

a plurality of processes supported by the execution environment;

a security application within the execution environment;

one or more key resources which are associated with the security application;

a security module configured to control access by the plurality of processes to the key resources associated with the security application using an access control list; and wherein the plurality of processes include at least one user process initially provided in an unprivileged user-level security context, the user process having low privileges and including an initial access token that defines the low privileges and access rights for the user process to allow the user process to access the one or more key resources according to the access control list;

wherein the security application is configured to perform process elevation, whereby the user process is examined and selectively granted a privileged user security context to dynamically elevate the privilege level of the user process; and wherein the computing device further comprises:

an anti-tamper mechanism configured to create a protection group as a local security group and add a deny access control entry to the access control list thereby restricting access to the key resources of the security application by members of the protection group;

wherein the anti-tamper mechanism is further configured to intercept the user process, create a revised access token which includes the protection group based on the initial access token of the user process, thereby identifying the user process as a member of the protection group, and apply the revised access token to the user process; and wherein the security module is configured to match the protection group in the revised access token of the user process against the deny access control entry in the access control list of the key resources thereby restricting access by the user process in response to the user process requesting access to any of the key resources of the security application.

13. The computer device of claim 12, wherein the anti-tamper mechanism is configured to dynamically modify the access token of the user process without terminating and restarting the user process.

14. The computer device of claim 12, wherein the anti-tamper mechanism is configured to intercept the user process upon start-up and to cause the user process to be started in a suspended state, and wherein the anti-tamper mechanism is configured to examine the user process while the user process is in the suspended state.

15. The computer device of claim 14, wherein the anti-tamper mechanism is configured to examine the user process by checking the user process against a set of policies using one or more attributes of the user process.

16. The computer device of claim 15, wherein the attributes of the user process include any one or more of a filename, a command line, a publisher of the user process, and an identity of a user of the user process.

17. The computer device of claim 16, wherein the key resources include any one or more of installed software of the security application, system services, drivers, files and registry settings.

18. A tangible, non-transient computer readable storage medium having recorded thereon instructions which, when implemented by a computer device having at least one memory unit and one or more processors, cause the computer device to perform the steps of:

providing a plurality of resources using the at least one memory unit and the one or more processors;

identifying one or more of the plurality of resources of the computer system as being key resources which are associated with a security application;

controlling access to the one or more key resources using an access control list;

providing a user process, initially, in an unprivileged user-level security context, the user process having low privileges and including an initial access token that defines the low privileges and access rights for the user process to allow the user process to access the key resources according to the access control list;

performing, by a security application, process elevation to selectively grant a privileged user-level security context to the user process thereby dynamically elevating the privilege level of the user process;

executing the user process in the user-level security context in accordance with the dynamically elevated privilege level;

creating a protection group as a local security group;

adding a deny access control entry to the access control list thereby restricting access to the key resources of the security application by members of the protection group;

intercepting the user process;

creating a revised access token by revising the initial access token of the user process to include the protection group, thereby identifying the user process as a member of the protection group;

applying the revised access token to the user process; and in response to the user process requesting access to any of the one or more key resources of the security application, matching the protection group in the revised access token of the user process against the deny access control entry in the access control list of the key resources, thereby restricting access by the user process to the key resources.

* * * * *